INVENTORS
NILS R. CARLSSON
JAN MALMROS
BY
AGENT

INVENTORS
NILS R. CARLSSON
JAN MALMROS
BY

AGENT

# United States Patent Office 3,308,459
Patented Mar. 7, 1967

3,308,459
DEVICE FOR TRANSMITTING HIGH FREQUENCY PULSES, PREFERABLY ADAPTED FOR A RADAR EQUIPMENT
Nils Rune Carlsson, Bandhagen, and Jan Malmros, Farsta, Sweden, assignors to North American Philips Company, Inc., New York, N.Y., a corporation of Delaware
Filed Apr. 9, 1963, Ser. No. 271,654
Claims priority, application Sweden, Apr. 11, 1962, 4,060/62
13 Claims. (Cl. 343—13)

The present invention relates to a radar apparatus of the type employing radar pulses of varying frequency. Such systems comprise a transmitter with a tunable transmitter tube, preferably a magnetron, and a device for continuously varying the tuning frequency of the transmitter tube within a predetermined frequency range. A device is provided for triggering the transmitter, comprising a control oscillator and a comparison device for comparing the oscillator frequency and the natural or tuning frequency of the transmitter tube. This device provides a trigger pulse for the transmitter in order to cause the transmitter to deliver a radar pulse upon the occurrence of a coincidence between the natural frequency of the transmitter tube and the control oscillator frequency. The frequency of the transmitter radar pulse is determined by the natural frequency of the transmitter tube at the triggering instant. A receiver with a local oscillator is also provided. The local oscillator may be the same oscillator as the control oscillator or it may be a separate oscillator. The local oscillator is adapted to produce, in combination with incoming reflected radar pulses, a predetermined, substantially fixed intermediate frequency.

According to one arrangement for radar apparatus of the above type, the control frequency is changed in random steps to any of a plurality of predetermined frequency values within the variation range of the natural frequency of the transmitter tube at instants between the reception of a radar pulse and the transmission of a succeeding pulse. In this arrangement a radar pulse is transmitted at the instant of coincidence between the variable natural frequency of the transmitter tube and the prevailing constant control frequency. A disadvantage of such a system is that the instant of transmission cannot be effectively controlled and determined in advance and the time intervals between successive radar pulses can vary greatly. In order to produce the trigger pulse, control frequency energy is applied to the tunable transmitter tube, and the control frequency energy reflected from the tunable transmitter tube is thereafter detected. Then the reflected and detected control frequency energy, which will have a minimum value at the instant of coincidence between the control frequency and the natural frequency, is differentiated. The shape of the trigger pulse produced in this way will be dependent upon the shape of the said minimum. The minimum in turn depends upon the mutual frequency variation speed of the two frequencies (the control frequency and the natural frequency) at the triggering instant. Since the natural frequency of the transmitter tube varies relatively slowly and the control frequency in the above device is locked on a constant value at the triggering instant, the trigger pulse in this arrangement will therefore be relatively extended in time. This is another disadvantage since a sharp triggering pulse is essential for accurately fulfilling the condition of coincidence. The latter is in turn essential for maintaining the fixed intermediate frequency equal to the difference between the natural frequencies of the transmitter tubes in its non-energized and energized condition respectively.

The present purpose of the invention is to eliminate these disadvantages. According to the invention this is achieved by providing a sweep circuit which, when actuated, is adapted to bring the control oscillator to make a frequency sweep within the said frequency range with a frequency variation speed which is several times greater than the maximum frequency variation speed for the natural frequency means for actuating said sweep circuit for the purpose of triggering the transmitter. Memory means are provided for storing information about the value of the control frequency at the triggering instant. This memory means, by means of the stored information, is adapted to keep the frequency of the local oscillator locked at a value substantially equal to the frequency thereof at the triggering instant during a time period corresponding at least to the echo time interval.

The sweep circuit may comprise the series combination of a resistance and a capacitor. The voltage across the capacitor being employed as a control voltage for regulating the frequency of the control oscillator. The capacitor is charged by way of the resistance for producing a frequency sweep. When using a carcinotron as control oscillator the circuit constants of the charging circuit for the capacitor may be chosen such in relation to the frequency curve of the control oscillator as function of the control voltage that the resulting frequency sweep with time will be linear.

The memory means may comprise a capacitor connected so that the voltage across the capacitor varies in accordance with variations in the frequency of the control oscillator, so that the voltage across the capacitor represents the instantaneous control oscillator frequency at each instant. Means are provided for stopping variations of the capacitor voltage at the triggering instant. When the same oscillator serves as the control oscillator and the local oscillator, the memory capacitor is preferably connected in the sweep circuit.

According to another feature of the invention a regulation resistance is connected in series with the capacitor in the sweep circuit. In this circuit the control voltage for the oscillator is derived from the series combination of the regulation resistance and the capacitor. This regulation resistance is controlled such that slow variations in the resulting mean intermediate frequency are counteracted.

The invention will now be explained more fully by means of example with reference to the accompanying drawings, in which.

Figure 1:
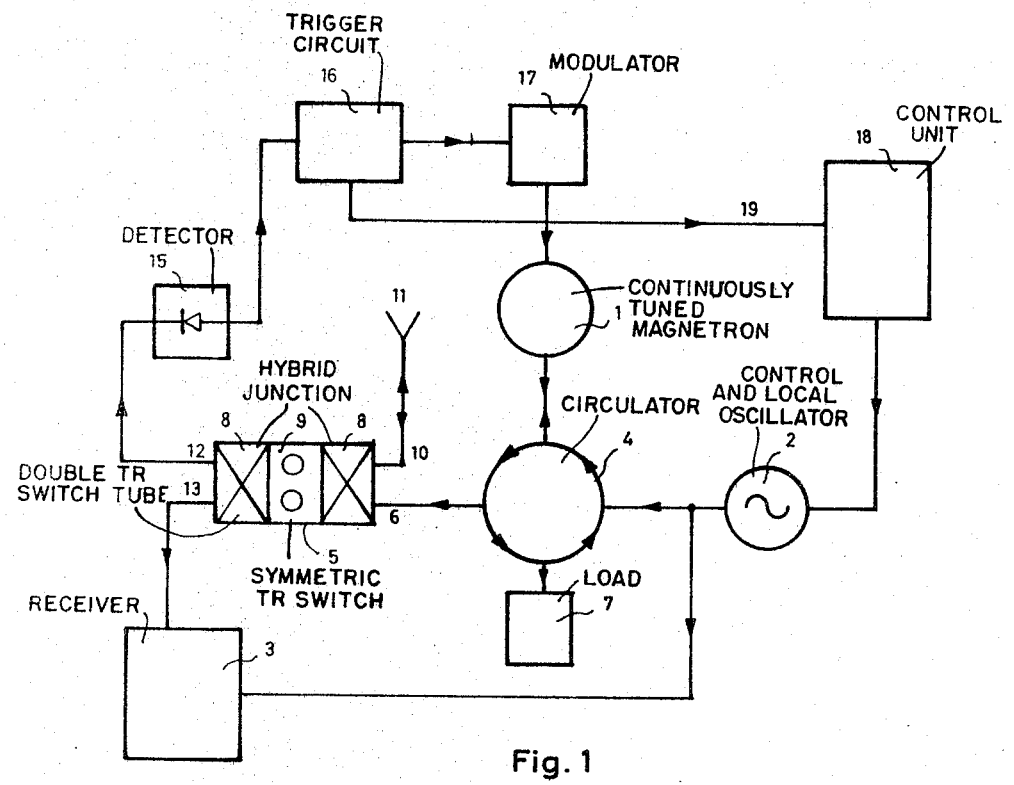
FIG. 1 is a block diagram for a radar equipment according to the invention.

In FIG. 1 the reference numeral 1 designates a transmitter tube having a tunable output circuit and including a device for producing continuous variation of the resonance frequency of the output circuit within a predetermined frequency range. As an example a magnetron of the kind described in the French Patent 1,167,523 may be employed for the transmitter tube. The reference numeral 2 designates a combined control and local oscillator. The output voltage of the oscillator is applied on the one hand to a receiver 3 in order to serve as local oscillator voltage when receiving echo signals, and on the other hand to one arm of a circulator 4. The next arm of the circulator, as seen in the energy transmission direction, is connected to the tunable output circuit of the transmitter tube. The arm of the circulator which follows the last-mentioned arm is connected to the first branch 6 of a balanced or symmetric TR-switch 5. The circulator 4 transmits the control A.C.-voltage to the tunable output circuit of the transmitter tube. Control A.C.-voltage reflected from this circuit and radar pulses produced by the transmitter tube are transmitted to the symmetric TR-switch. Eventual energy reflected from the symmetric TR-switch is transmitted by the circulator to a terminal load 7.

The symmetric TR-switch, which may consist of a pair of hybrid junctions 8 and an intermediate double TR-switch tube 9 transmits, in a manner known per se, energy having sufficient power for exciting the TR-switch tube to a second branch 10. An aerial 11 is connected to the branch 10. Energy of relatively low power is transmitted from the branch 6 to a third branch 12. The radar pulses produced by the magnetron are thus transmitted to the branch 10 and the reflected control voltage energy having relatively low power is transmitted to the branch 12. Echo pulses received by the aerial are transmitted to a fourth branch 13 and are then applied to the receiver 3. The received pulses are mixed in the mixing stage of the receiver with the output voltage from the oscillator 2, which at this time serves as local oscillator, for producing an intermediate frequency signal.

The control A.C.-voltage appearing in the branch 12 is detected in a detector device 15 and the output voltage from the detector is applied to a trigger pulse unit 16. The device 16 is adapted, at the time of coincidence between the frequency of the control A.C.-voltage and the resonance frequency of the tunable output circuit of the magnetron, i.e., when the reflected control A.C.-voltage measured by the detector device is minimum, to trigger a modulator 17 so that the modulator delivers its energy to the magnetron 1 and energizes the tube to produce a radar pulse of required duration.

The oscillator 2, the frequency of which according to the invention is normally outside the variation range for the resonance frequency of the magnetron output circuit, is energized by a control unit 18 to start a frequency sweep into the variation range at an arbitrarily determined moment until coincidence occurs when according to the foregoing the modulator is triggered and a radar pulse is transmitted. At the triggering instant a pulse is fed back from the trigger pulse unit 16 through the lead 19 to the control unit 18. One purpose of this is to stop the frequency sweep, so that the oscillator frequency from the triggering moment and during a time interval somewhat exceeding the maximum echo time is locked at a value which, as shall be described in the following, deviates somewhat from the oscillator frequency at the triggering instant. The oscillator 2 now serves as local oscillator and the intermediate frequency when receiving reflected radar pulses will be equal to the difference between the frequency to which the oscillator is locked during the echo time interval and the natural frequency of the transmitter tube in excited condition (warm frequency) at the triggering instant. After the end of the echo time interval the oscillator frequency will automatically return to the initial value and the process is repeated.

Figure 2:
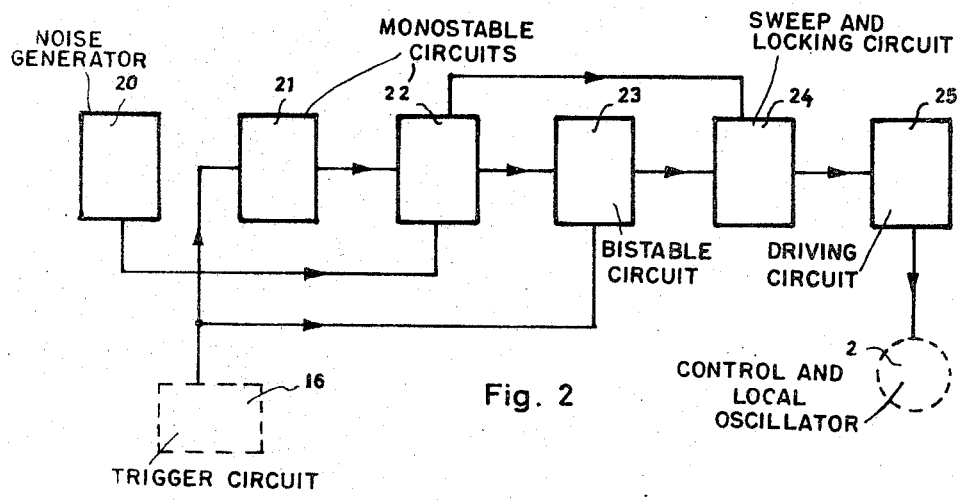
FIG. 2 is a block diagram for the control unit included in the equipment shown in FIG. 1.

A suitable apparatus for the control unit 18 is shown in FIG. 2 in which the reference numeral 20 designates a noise generator, 21, 22 and 23 designate a number of flip-flops, 24 designates a sweep- and locking circuit and 25 designates a driving circuit for the oscillator 2 which in the example shown is assumed to be a carcinotron. The construction and connection of the different components included in the control unit is evident from the following function description, special reference being made to the time diagram shown in FIG. 3 in which (a) refers to the transmitted high frequency energy, (b), (c) and (d) show variations in voltage with time for the different flip-flops 21, 22 and 23, respectively, and (e) shows the output voltage from the sweep and locking circuit serving as control voltage for regulating the frequency of the oscillator 2. The diagram 3(g) finally, shows the resulting frequency variation with time for the oscillator 2 and in this figure curves are also included showing the frequency variation for the magnetron as a function of time.

Triggering and transmission of a radar pulse is assumed to occur at the time $t_1$. A pulse from the trigger pulse unit switches the first flip-flop 21 at the time $t_1$ (FIG. 3b). Flip-flop 21 is a monostable circuit and is adjusted to return to its stable position after a time interval somewhat exceeding the maximum echo time interval. Flip-flop returns to its initial position after the end of the echo time interval at the instant $t_2$ and switches the following flip-flop 22 at the time $t_2$ (FIG. 3c). Flip-flop 22 is also a monostable circuit but the return of this circuit can be varied to a certain degree, the return moment being determined by a signal from the noise generator 20. The return moment may vary within the shadowed region in FIG. 3(c) dependent on the actual signal received from the noise generator. When returning at the moment $t_3$ the flip-flop 22 switches the next flip-flop 23 (FIG. 3d). Flip-flop 23 is of the bistable type and is adapted to start a frequency sweep of the oscillator 2. This is achieved by connecting the flip-flop 23 to a sweep and locking circuit 24 which produces a voltage varying continuously with time (FIG. 3e). This voltage is applied to the control electrode of the carcinotron 2 by way of driving circuit 25.

Figure 4:
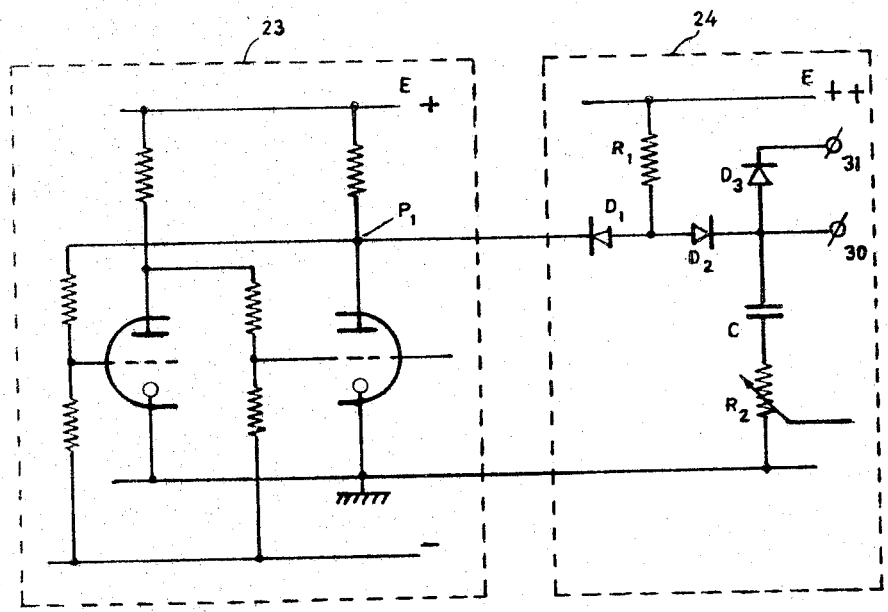
FIG. 4 is a circuit diagram for a section of the control unit.

The construction of the sweep and locking circuit 24 is illustrated in FIG. 4 which also shows a circuit diagram for the bistable flip-flop 23. The flip-flop 23 is of conventional construction and is not described in detail.

Figure 3:
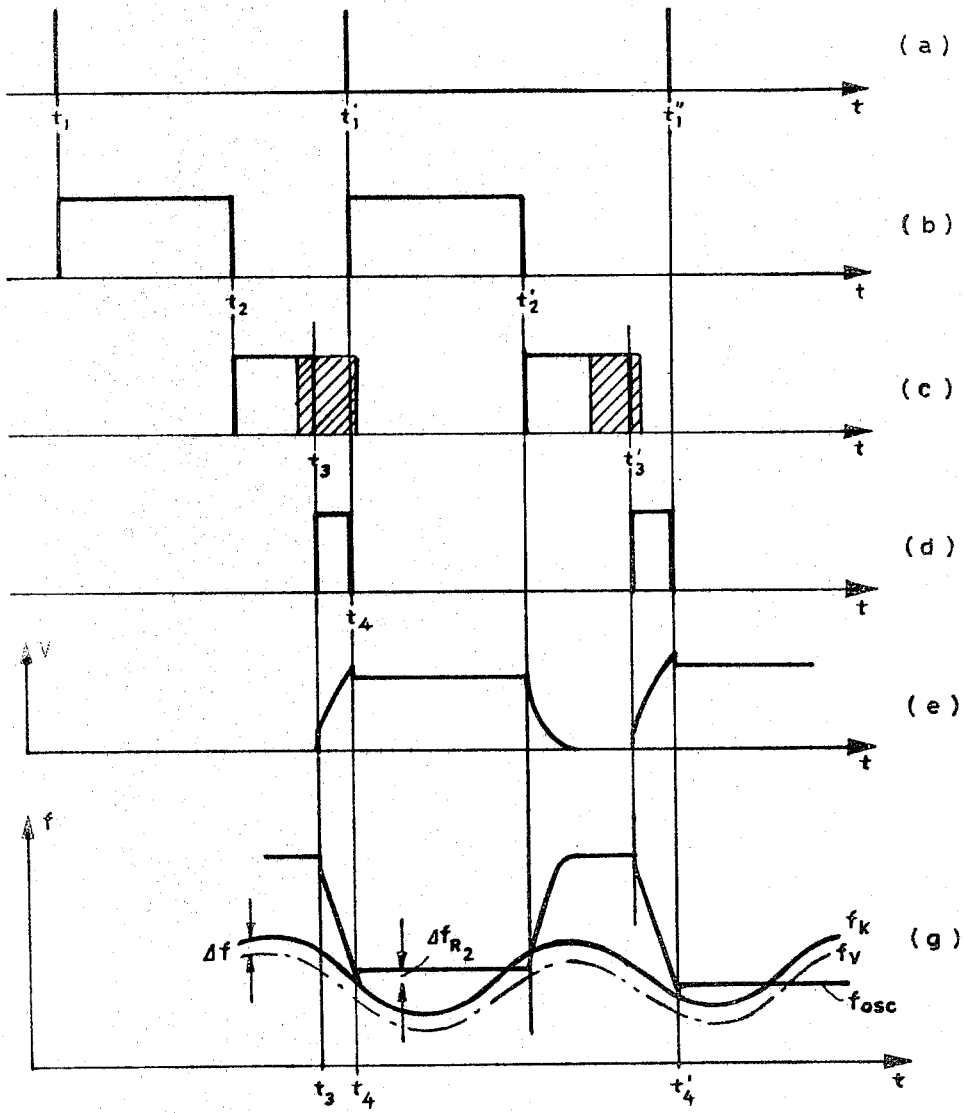
FIG. 3 is a diagram which illustrates the characteristics of the equipment of FIGS. 1 and 2 as a function of time.

The sweep and locking circuit consists of an R.C.-series circuit comprising a capacitor C and a resistance $R_1$ and a number of diodes $D_1$, $D_2$ and $D_3$. A small regulation resistance $R_2$ is connected in series with the capacitor. The output voltage of the circuit appearing at the output terminal 30 is derived from the series combination of the capacitor C and the regulation resistance $R_2$. A further terminal 31 is connected to the flip-flop 22. The circuit operates as follows:

In the interval before a frequency sweep, i.e. in the interval between $t_2$ and $t_3$ in FIG. 3, flip-flop 22 is set in its unstable position and flip-flop 23 is set in its position with the right hand part conducting. The voltage applied at terminal 31 is such that diodes $D_2$ and $D_3$ are conducting. The voltage of the output terminal 30 is substantially equal to the voltage applied to terminal 31 from flip-flop 22 since the voltage drop across the conducting diode $D_3$ is small. At the instant $t_3$ (FIG. 3) flip-flop 22 returns to its stable position and switches the flip-flop 23 to its position with the left hand part conducting. When returning to its stable position flip-flop 22 causes a stepwise increase of the voltage at the terminal 31 so that diode $D_3$ is made non-conductive. The voltage of the point $P_1$ also increasing stepwise at the instant $t_3$ so that diode $D_1$ is held cut-off during the following period. The capacitor C is now free to increase its voltage and charging of the capacitor starts. The charging takes place from the voltage source $E_{++}$ through resistance $R_1$, diode $D_2$ and the small regulation resistance $R_2$. Due to the resistance $R_2$ in series with the capacitor C a stepwise increase in the output voltage from the sweep circuit will appear in the moment $t_3$, whereafter the output voltage increases continuously with time due to the charging of the capacitor. (The purpose of using the voltage source $E_{++}$ instead of $E_+$ for charging the capacitor C is that in this way a more rectilinear charging curve is achieved since $E_{++}$ has a higher voltage value than $E_+$.) The output voltage from the sweep and locking circuit is applied by way of the output terminal 30 to the control electrode of the oscillator and causes a frequency sweep of the output voltage of the oscillator, as is shown by the diagram 3(g).

When using a carcinotron as local oscillator, the frequency of which varies with the applied control voltage according to an exponential function, the advantage can be achieved by suitable choice of the time constant for the charging circuit of the capacitor that the curvatures of the two curves cancel each other so that the resulting frequency variation with time will be linear. When dimensioning the circuit constants in this way the two stepwise variations in frequency caused by the resistance $R_2$ at the beginning and the end of the frequency sweep will also be equal in spite of the fact that the corresponding stepwise variations in the control voltage are different dependent on the decreasing of the charging current with time. A requirement placed on the sweep variation speed is that it must be great in relation to the maximum variation speed of the resonance frequency of the magnetron, shown in FIG. 3($g$) by the curve $f_k$, since otherwise the required sharp form of the trigger pulse would not be obtained.

The frequency sweep will continue until coincidence with the resonance frequency of the magnetron occurs at the moment $t_4=t_1'$ at which time the modulator 17 is triggered via the trigger pulse unit 16 and a radar pulse is transmitted. From the trigger pulse unit 16 a pulse is derived at the triggering instant, which pulse in a way described above is applied to the first flip-flop 21 in order to switch the said flip-flop, this pulse is also applied to the bistable flip-flop 23 for to making this circuit return to its initial position with the right hand part conducting. As a result, the voltage of the point $P_1$ decreases greatly and the diode $D_1$ conducts. The voltage of the left hand terminal of diode $D_2$ thus also decreases so that the diode $D_2$ is made non-conductive and the charging of the capacitor is interrupted. At the instant $t_4=t_1'$ a stepwise decrease of the output voltage of the sweep and locking circuit occurs due to the regulation resistance $R_2$ and the stepwise variation of the output voltage of the sweep and locking circuit causes a corresponding stepwise variation of the local oscillator frequency. The value of the frequency variation is dependent on the instantaneous value of the regulation resistance $R_2$. The capacitor voltage and consequently the local oscillator frequency is thereafter constant during the whole echo time interval. At the end of the echo time interval in moment $t_2'$ (FIG. 3) the second flip-flop 22 is switched to its unstable position and in doing so the flip-flop 22 decreases the voltage of the terminal 31 so that the diode $D_3$ conducts and the capacitor C is discharged through diode $D_3$ to a rest voltage determined by the voltage appearing at the terminal 31. The time constant of the discharging circuit is chosen such that the capacitor is completely discharged to the rest voltage before the flip-flop 22 returns to its stable position and a new frequency sweep starts in the moment $t_3'$.

FIG. 3($g$) also shows the variation of the natural frequency of the magnetron with time curve $f_k$ drawn in continuous line illustrating the variations in the natural frequency of the magnetron in unexcited condition (cold frequency) and the curve $f_v$ drawn in dashed line illustrating the variations in the natural frequency of the magnetron in excited condition (warm frequency). As is shown the warm frequency is displaced by a substantially constant distance $\Delta f$ from the cold frequency. This distance, however, may undergo a slow variation with time due to ageing, changed operation conditions, replacement of tube or the like. If no precautions are taken this variation will give rise to a corresponding variation in the intermediate frequency when receiving reflected radar pulses. The resistance $R_2$ has the function of compensating for these slow variations so that a substantially constant resulting mean intermediate frequency is received (the rapid variations in the intermediate frequency from pulse to pulse are not dealt with in the present example). The resulting intermediate frequency I.F. for the actual radar pulse will according to FIG. 3($g$) be $\Delta I.F.=\Delta f+\Delta f_{R2}$ where $\Delta f$ is the difference between the cold and warm frequencies of the magnetron in the triggering moment and $\Delta f_{R2}$ is the stepwise variation in the oscillator frequency at the end of the frequency sweep caused by the resistance $R_2$. The resistance $R_2$ is variable and is controlled by means of a signal varying in dependence on slow variations in the mean value taken over a large number of pulses of the deviation of the intermediate frequency defined above from a required intermediate frequency. Thus, if the mean intermediate frequency tends to change slowly with time, for example due to ageing, the resistance $R_2$ will be regulated in such a direction that the variation is counteracted and the resulting intermediate frequency will be substantially constant.

Figure 5:
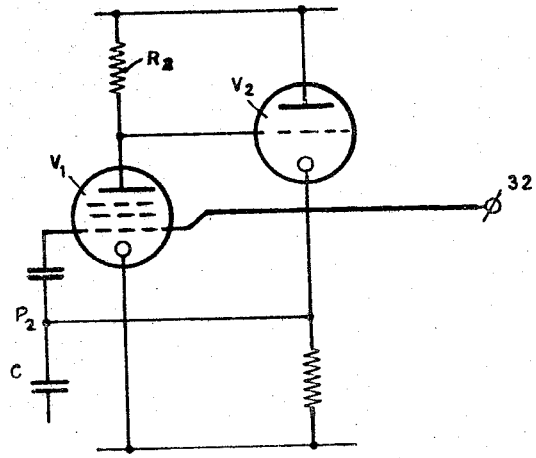
FIG. 5 is a circuit diagram of a controllable resistance which can be used in the equipment according to the invention.

The resistance $R_2$ may be a tube circuit as shown in FIG. 5. This circuit comprises two tubes, an amplifier pentode $V_1$ and a triode $V_2$ connected as a cathode follower. The cathode of tube $V_2$ is connected by way of a conductor to the grid of the tube $V_1$. The capacitor C of the arrangement of FIG. 4 is connected to the cathode of the last tube $V_2$ and the control voltage is fed to the control grid of the tube $V_1$ by way of the terminal 32. For this circuit the resistance value between the point $P_2$ and ground ($R_2$) is especially dependent upon the conductance of the second tube at the actual working point and also a function of the conductance of the first tube and the resistance $R_a'$. The working points and thereby the resistance at the point $P_2$ is varied in dependence upon the value of the incoming control signal.

Many modifications of the described embodiment are possible within the scope of the invention. Thus, the control oscillator may be set such that it normally produces a frequency lying below the variation range for the natural frequency of the transmitter means instead of above the said range, as in the example shown. The control unit may be designed in any suitable way and may for example work quite independently without getting control information from the trigger pulse unit. It is also possible to replace the combined control and local oscillator with two separate oscillators, one of these oscillators serving as local oscillator and the second as control oscillator. In this case the oscillators are coupled to each other so that they have a predetermined frequency relationship at least at the triggering instant and at least the local oscillator has a constant frequency during the echo time interval.

What is claimed is:

1. A radar system comprising a source of first high frequency oscillations having tuned oscillation frequency determining means, a modulator connected to energize said source of first oscillations, the said source of first oscillations comprising means for continuously varying the tuning frequency of said tuned means, a source of second oscillations, means connected to compare the frequency of said second oscillations with the unexcited resonant frequency of said tuned means to derive a signal when a predetermined relationship exists between said unexcited resonant frequency and the frequency of said second oscillations, means for applying said signal to said modulator to momentarily energize said source of first oscillations, means for transmitting said first oscillations, means for receiving said first oscillations reflected from a target and for mixing said reflected oscillations with said second oscillations, means responsive to said signal for holding the frequency of said second oscillations substantially constant for a predetermined time subsequent the occurrence of said signal and for continuously varying the frequency of said second oscillator at a rate faster than the variation of tuning frequency of said tuned means between the termination of said predetermined time and the next occurrence of said signal.

2. A radar system comprising a source of first high frequency oscillations having tuned oscillation frequency determining means, said source of first oscillations comprising means for continuously varying the tuning frequency of said tuned means, means providing control oscillations and local oscillations, means connected to compare the frequency of said control oscillations with the unexcited resonant frequency of said tuned means to derive a signal when a predetermined relationship exists between said unexcited resonant frequency and the frequency of said control oscillations, modulator means responsive to said signal for momentarily energizing said source of first oscillations, means for transmitting said first oscillations, means for receiving said first oscillations reflected from a target and mixing said reflected first oscillations with said local oscillations to produce intermediate frequency oscillations, means responsive to said signal for holding the frequency of said local oscillations substantially constant for a predetermined time subsequent the occurrence of said signal, and means for continuously varying the frequency of said control oscillations at a rate faster than the variation of tuning frequency of said tuned means between the termination of said predetermined time and the next occurrence of said signal.

3. A radar system comprising a source of first high frequency oscillations having tuned oscillation frequency determining means, said source of first oscillations comprising means for continuously varying the tuning frequency of said tuned means, a source of second oscillations, means connected to compare the frequency of said second oscillations with the unexcited resonant frequency of said tuned means to derive a triggering signal when a predetermined relationship exists between said unexcited resonant frequency and the frequency of said second oscillations, modulator means responsive to said triggering signal for momentarily energizing said source of first oscillations, means for transmitting said first oscillations, means for receiving said first oscillations reflected from a target, means for mixing said reflected signals and second oscillations to produce an intermediate frequency signal, and control means responsive to said triggering signal for controlling the frequency of said second oscillations, said control means comprising means for holding the frequency of said second oscillations substantially constant for a predetermined time subsequent said triggering signal and for continuously varying the frequency of said second oscillations at a rate faster than the variation of the tuning frequency of said tuned means between the termination of said predetermined time and the next occurrence of said signal.

4. The system of claim 3, wherein said control means comprises means for producing a control voltage for regulating the frequency of said second oscillations, said means producing a control voltage comprising a series connected resistor and capacitor, means for initiating the charge of said capacitor through said resistor at the termination of said predetermined time, and means for deriving said control voltage from said capacitor.

5. The system of claim 4, comprising means for stopping charging of said capacitor at the occurrence of said triggering signal, whereby said control voltage is held constant for said predetermined time.

6. A radar system comprising a source of first high frequency oscillations having tuned oscillation frequency determining means, said source of first oscillations comprising means for continuously varying the tuning frequency of said tuned means, a source of second oscillations, means connected to compare the frequency of said second oscillations with the unexcited resonant frequency of said tuned means to derive a triggering signal when a predetermined relationship exists between said unexcited resonant frequency and the frequency of said second oscillations, modulator means responsive to said triggering signal for momentarily energizing said source of first oscillations, means for transmitting said first oscillations, means for receiving said first oscillations reflected from a target, means for mixing said reflected signals and second oscillations to produce an intermediate frequency signal, and control means responsive to said triggering signal for controlling the frequency of said second oscillations, said control means comprising means for producing a control voltage for controlling the frequency of said second oscillations, said means for producing a control voltage comprising a series connected resistor and capacitor, means for initiating charging of said capacitor through said resistor subsequent the termination of said predetermined time and for terminating said charging at the next occurrence of a triggering signal, and means for holding the charge on said capacitor constant during said predetermined time, whereby said second oscillations have a constant frequency during said predetermined time and the frequency thereof varies at a rate faster than the variation of said tuning frequency of said tuned means subsequent said predetermined time.

7. The system of claim 6, comprising bistable circuit means, and means connecting said bistable circuit means whereby said capacitor charges during one stable state of said bistable circuit means and said charging is interrupted during the other stable state of said bistable circuit means.

8. The system of claim 6, comprising first and second monostable circuits, a bistable circuit, means applying said triggering signal to said first monostable circuit means for setting said first monostable circuit to its unstable state, whereby said first monostable circuit returns to its stable state after said predetermined time and sets said second monostable circuit to its unstable state, means connecting said second monostable circuit to said bistable circuit whereby said bistable circuit assumes one stable state when said second monostable circuit returns to its stable state, means applying said triggering signal to said bistable circuit whereby said bistable circuit assumes a second stable state upon occurrence of said triggering signal, and means connecting said bistable circuit to said series resistor-capacitor circuit for charging said capacitor only during the time of said one stable state of said bistable circuit.

9. The system of claim 8, comprising means for connecting said second monostable circuit to said series resistor-capacitor circuit whereby said capacitor is discharged during the time of the unstable state of said second monostable circuit.

10. The system of claim 9, comprising noise generation means connected to said second monostable circuit for resetting said second monostable circuit to its stable state at an unpredetermined time.

11. A radar system comprising a source of first high frequency oscillations having tuned oscillation frequency determining means, said source of first oscillations comprising means for continuously varying the tuning frequency of said tuned means, a source of second oscillations, means connected to compare the frequency of said second oscillations with the unexcited resonant frequency of said tuned means to derive a triggering signal when a predetermined relationship exists between said unexcited resonant frequency and the frequency of said second oscillations, modulator means responsive to said triggering signal for momentarily energizing said source of first oscillations, means for transmitting said first oscillations, means for receiving said first oscillations reflected from a target, means for mixing said reflected signals and second oscillations to produce an intermediate frequency signal, and control means responsive to said triggering signal for controlling the frequency of said second oscillations, said control means comprising means for producing a control voltage for controlling the frequency of said second oscillations, said means for producing a control voltage comprising the series connection of first and second resistors and a capacitor, means for initiating charging of said capacitor through said first resistor subsequent the termination of said predetermined time and for terminating said charging at the next occurrence of a triggering signal, means for holding the charge on said capacitor constant during said predetermined time, and means for deriving said control voltage from across said second resistor and capacitor, whereby a stepwise variation of frequency of said second oscillations occurs at the occurrence of said triggering pulse.

12. The system of claim 11, comprising means for controlling the value of said second resistor as a function of variation of the mean value of the frequency of said intermediate frequency signal.

13. The system of claim 12, wherein said second resistor comprises a reactance tube circuit.

References Cited by the Examiner

UNITED STATES PATENTS 2,461,144  2/1949  Cook _____ 343—17.2
2,913,717  11/1959 Brandon et al. _____ 343—17.2

CHESTER L. JUSTUS, *Primary Examiner.*

R. E. KLEIN, J. P. MORRIS, *Assistant Examiners.*